(12) United States Patent
Buzzard et al.

(10) Patent No.: US 8,931,805 B2
(45) Date of Patent: Jan. 13, 2015

(54) TELESCOPING SHAFT ROLLER ASSEMBLY IN STEERING COLUMN

(71) Applicants: Donald A. Buzzard, Saginaw, MI (US); Melvin Lee Tinnin, Clio, MI (US); Troy A. Daenzer, Reese, MI (US)

(72) Inventors: Donald A. Buzzard, Saginaw, MI (US); Melvin Lee Tinnin, Clio, MI (US); Troy A. Daenzer, Reese, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 126 days.

(21) Appl. No.: 13/690,606

(22) Filed: Nov. 30, 2012

(65) Prior Publication Data
US 2014/0150597 A1    Jun. 5, 2014

(51) Int. Cl.
*F16C 3/035*   (2006.01)
*B62D 1/185*   (2006.01)
*F16D 3/06*    (2006.01)

(52) U.S. Cl.
CPC ............... *B62D 1/185* (2013.01); *F16D 3/065* (2013.01); *F16C 3/035* (2013.01)
USPC ............................. 280/775; 74/493; 464/167

(58) Field of Classification Search
CPC .......... F16C 3/035; B62D 1/185; F16D 3/065
USPC .............................. 464/167; 74/493; 280/775
See application file for complete search history.

(56) References Cited

U.S. PATENT DOCUMENTS

| | | | | |
|---|---|---|---|---|
| 3,304,745 | A * | 2/1967 | King et al. | 464/168 |
| 3,356,424 | A * | 12/1967 | Edwards | 384/45 |
| 3,494,148 | A * | 2/1970 | Young | 464/168 |
| 4,254,639 | A * | 3/1981 | Teramachi | 464/167 |
| 6,200,225 | B1 * | 3/2001 | Hobaugh, II | 464/167 |
| 6,343,993 | B1 * | 2/2002 | Duval et al. | 464/167 |
| 6,805,637 | B2 * | 10/2004 | Perea, Jr. et al. | 464/168 |
| 7,147,375 | B2 * | 12/2006 | Zernickel et al. | 384/49 |
| 7,322,607 | B2 * | 1/2008 | Yamada et al. | 280/755 |
| 7,526,978 | B2 * | 5/2009 | Bahr et al. | 74/492 |
| 8,123,407 | B2 * | 2/2012 | Shirai | 384/43 |
| 8,435,124 | B2 * | 5/2013 | Klukowski | 464/167 |
| 8,556,736 | B2 * | 10/2013 | Janvier et al. | 464/167 |
| 2005/0257639 | A1 * | 11/2005 | Yamada | 74/493 |
| 2006/0053934 | A1 | 3/2006 | Bahr et al. | |
| 2009/0272220 | A1 * | 11/2009 | Klukowski | 74/493 |

* cited by examiner

*Primary Examiner* — James English
(74) *Attorney, Agent, or Firm* — Cantor Colburn LLP

(57) ABSTRACT

A telescoping shaft having a roller assembly in a steering column is provided. The telescoping shaft includes an outer shaft having at least one projection or at least one groove, and an inner shaft telescopically received in the outer shaft, the inner shaft having the other of the at least one groove and the at least one projection, the at least one groove matingly engaging the at least one projection, each of the at least one grooves having a mounting section formed therein. A roller assembly is positioned in the mounting section of each of the at least one grooves and includes a spring having a first biasing section and a second biasing section, a first plurality of rollers positioned on the first biasing section and a second plurality of rollers positioned on the second biasing section, the at least one projection extending between the first plurality of rollers and the second plurality of rollers.

16 Claims, 4 Drawing Sheets

A-A

TELESCOPING SHAFT ROLLER ASSEMBLY IN STEERING COLUMN

BACKGROUND OF THE INVENTION

The following description relates to a telescoping shaft in a steering column, and in particular, a roller assembly positioned between telescoping components of the telescoping shaft.

A telescoping shaft, such as an intermediate shaft, is commonly positioned in a steering column between an output shaft of the steering column and an input shaft of a steering gear. The intermediate shaft is used to transfer steering torque from the output shaft of the steering column to the input shaft of the steering gear.

A conventional intermediate shaft may include an outer tubular shaft element and an inner solid shaft element telescoped into the tubular shaft element. The tubular shaft element and solid shaft element may be coupled together to permit relative linear movement therebetween. To this end, roller bearings may be provided between the tubular shaft and solid shaft. Accordingly, a total length of the shaft components may be adjusted for use in a particular vehicle. Length change of the intermediate shaft is also desirable for assembly into the vehicle and/or to reduce force inputs to the steering column, for example, when the vehicle is driven on rough roads. Alternatively, the inner solid shaft may be an inner tubular shaft telescoped into the tubular shaft.

The roller bearings used in intermediate shafts may be linear bearings, which often use hardened steel roller or balls as a low friction mechanism between the solid shaft and tubular shaft. However, manufacturing tolerances may cause small clearances to exist in such an arrangement, and require a mechanism for delashing, i.e., taking up the clearances between the components. A torsion spring has been used to preload rollers against respective tubular shaft interfaces. However, such an arrangement may be difficult and/or costly to assemble and/or manufacture.

Accordingly, it is desirable to provide a telescoping shaft assembly having a rolling element disposed therein that includes an easy to assemble and/or install mechanism to allow for smooth relative movement between shaft components and delashing between the shaft components.

SUMMARY OF THE INVENTION

According to an exemplary embodiment of the present invention, there is provided a telescoping shaft in a steering column including an outer shaft having a bore extending in a longitudinal direction and at least one projection or at least one groove, and an inner shaft telescopically received in the bore, the inner shaft having the other of the at least one groove and the at least one projection, the at least one groove matingly engaging the at least one projection of the outer shaft so that the inner shaft is rotationally fixed relative to the outer shaft and moveable relative to the outer shaft in the longitudinal direction, each of the at least one grooves having a mounting section formed therein. A roller assembly is positioned in the mounting section of each of the at least one groove of the inner shaft and includes a spring extending within the mounting section and having a first biasing section and a second biasing section, a first plurality of rollers positioned on the first biasing section of the spring, and a second plurality of rollers positioned on the second biasing section of the spring, the at least one projection extending between the first plurality of rollers and the second plurality of rollers.

According to another exemplary embodiment of the present invention, there is provided a roller assembly for use in a telescoping shaft of a steering column, the roller assembly having a spring extending within the mounting section, the spring having a base section, a first leaf extending from the base section and a second leaf extending from the base section, a first plurality of rollers linearly positioned on the first leaf of the spring, and a second plurality of rollers linearly positioned on the second leaf of the spring, the second plurality of rollers spaced from, and extending parallel to the first plurality of rollers.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
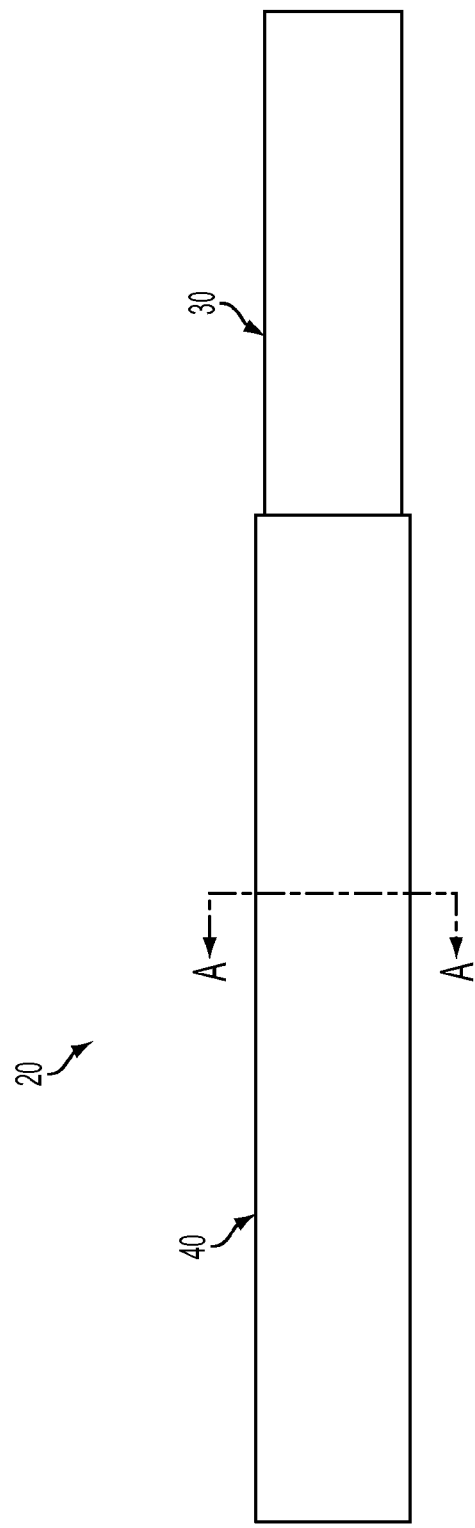
FIG. 1 is a side view of a telescoping shaft of a steering column according to an exemplary embodiment of the present invention.

Referring now to the Figures, where the invention will be described with reference to specific embodiments, without limiting same, FIG. 1. With reference to FIG. 1, the telescoping shaft 20 includes an inner shaft 30 and an outer shaft 40. The inner shaft 30 is telescopically received within the outer shaft 40. In an exemplary embodiment the telescoping shaft may be an intermediate shaft in a steering column. However, the present invention is not limited to such a configuration, and it is understood that the telescoping shaft may be, for example, a steering shaft as well.

Figure 2:
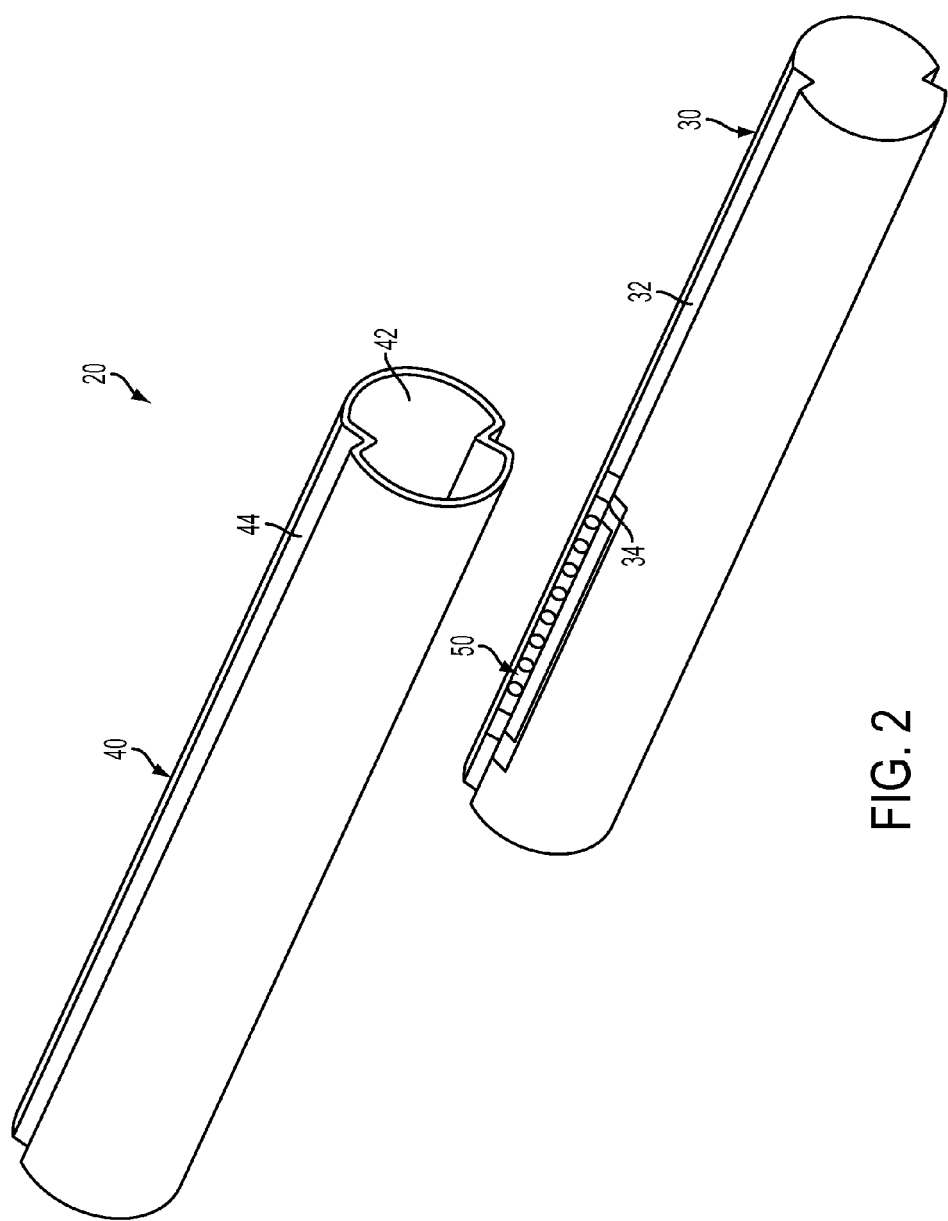
FIG. 2 is an exploded view of the telescoping shaft according to an exemplary embodiment of the present invention.

FIG. 2 is an exploded view of the telescoping shaft 20 according to an exemplary embodiment of the present invention. With reference to FIG. 2, the inner shaft 30 and outer shaft 40 are formed as substantially consistent cross-sectioned bodies. The inner shaft 30 may be formed as a solid or tubular body, and include at least one groove 32 that may be angled. The at least one angled groove 32 extends along a length of the inner shaft 30 and has a width and a depth. The width of the angled groove 32 decreases as the depth, measured from an outer surface toward a center of the inner shaft 30, increases. A mounting section 34 is formed in the angled groove 32. In an exemplary embodiment, the mounting section 34 has a greater width and a depth than the angled groove 32. The mounting section 34 is configured to receive a roller assembly 50 as described further below.

The outer shaft 40 includes a bore 42 extending in a longitudinal direction. The outer shaft 40 also includes at least one projection 44 that may be angled. The at least one angled projection 44 extends along a length of the outer shaft 40 in the longitudinal direction. The bore 42 of the outer shaft 40 is configured to receive the inner shaft 30. The angled projection 44 is configured to project into the angled groove 32 of the inner shaft 30 when the inner shaft 30 is received within the bore 42 of the outer shaft 40. Relative rotation between the inner shaft 30 and outer shaft 40 may be substantially prevented by the angled projection 44 extending to the angle groove 32, while relative linear movement is permitted so that a length of the telescoping shaft 20 may be varied.

Figure 3:
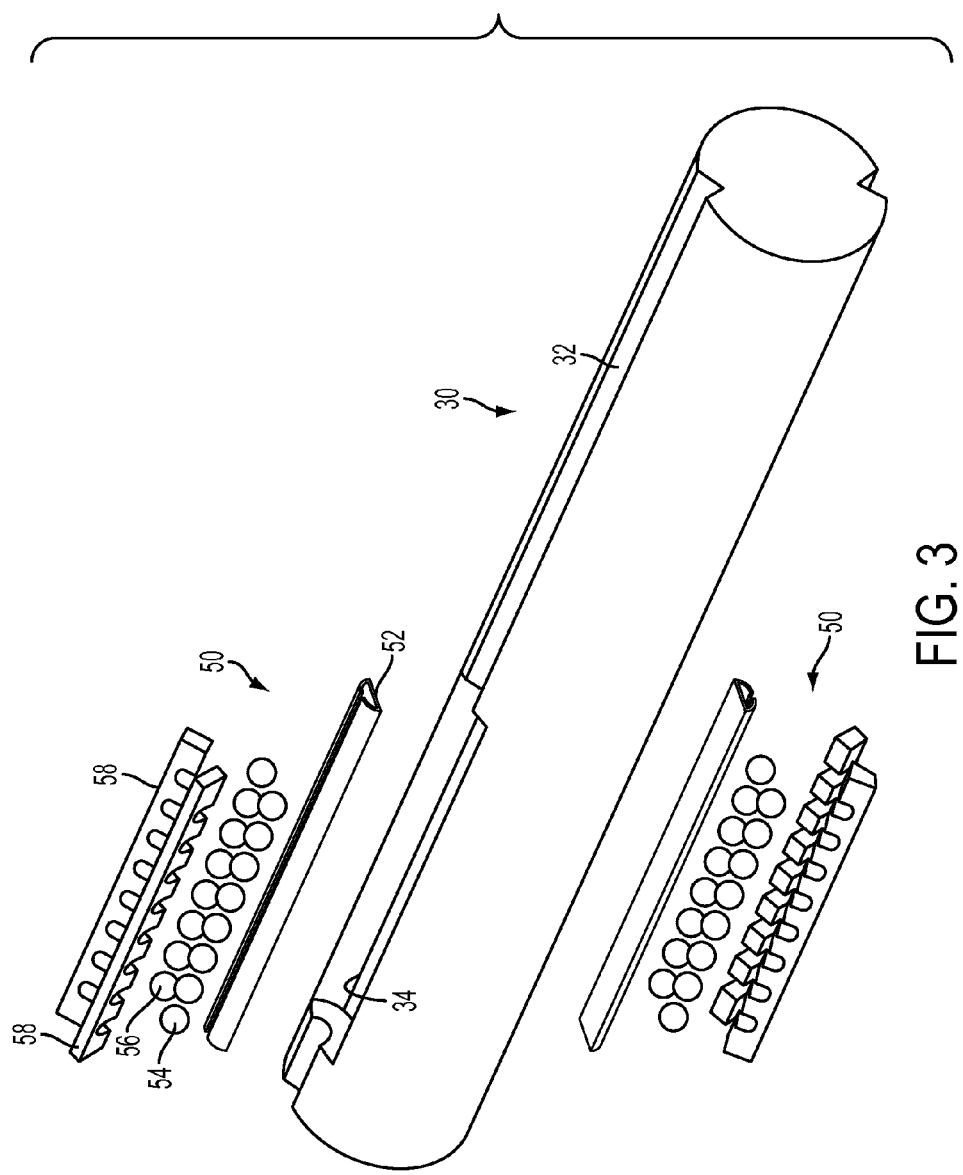
FIG. 3 is an exploded view of the roller assembly relative to the inner shaft according to an exemplary embodiment of the present invention.

FIG. 3 is an exploded view of the roller assembly 50 relative to the inner shaft 30 according to an exemplary embodiment of the present invention. In an exemplary embodiment, the roller assembly 50 includes a spring 52, a first plurality of rollers 54, and a second plurality of rollers 56. The spring 52 extends in the longitudinal direction and is positioned in the mounting section 34 of the inner shaft 30. The first plurality of rollers 54 extends generally linearly and the second plurality of rollers 56 extends generally linearly, parallel to the first plurality of rollers 54. In an exemplary embodiment the first plurality of rollers 54 and second plurality of rollers 56 are both roller balls.

The roller assembly 50 may further include first and second retainers 58 for retaining the first plurality of rollers 54 and the second plurality of rollers 56, respectively. Each retainer 58 includes a plurality of openings configured to receive respective rollers of the first plurality of rollers 54 and second plurality of rollers 56 to maintain individual rollers of the first plurality rollers 54 and second plurality of rollers 56 in a desired position.

Figure 4:
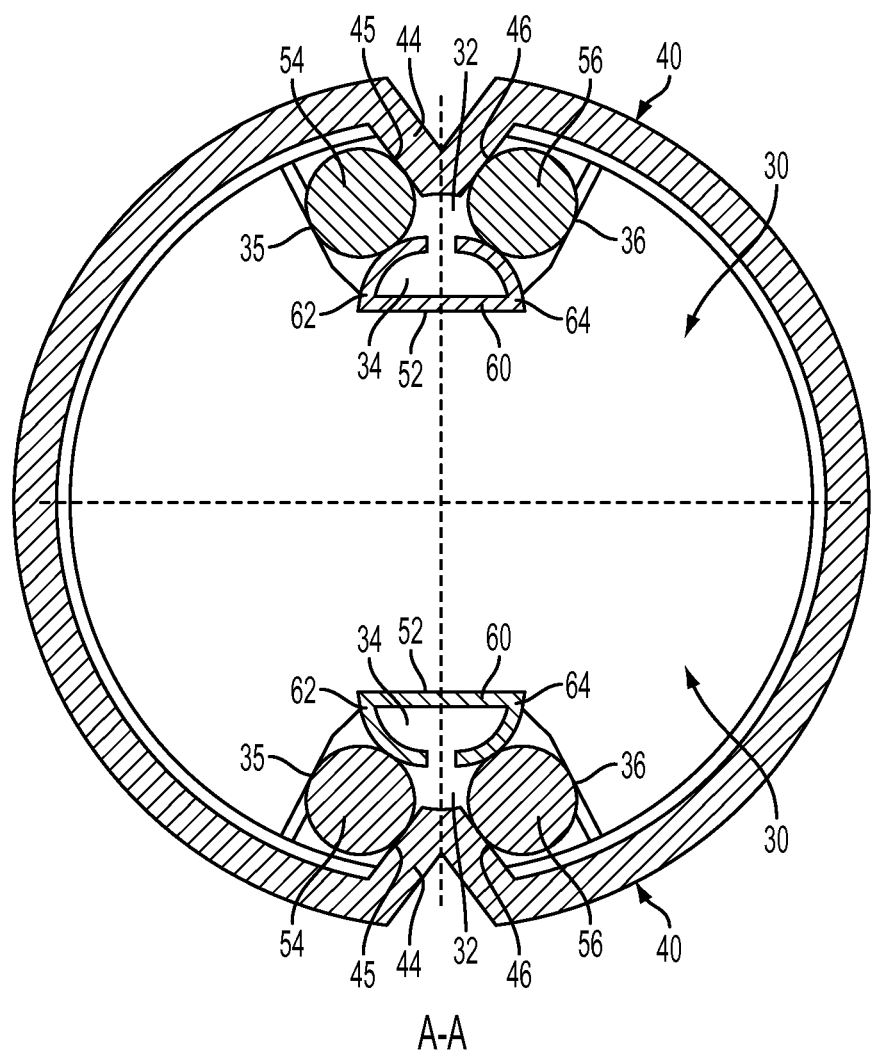
FIG. 4 is a cross section of FIG. 1 taken at A-A of the telescoping shaft 20 according to an exemplary embodiment of the present invention.

FIG. 4 is a cross section of FIG. 1 taken at A-A of the telescoping shaft 20 according to an exemplary embodiment of the present invention. Referring to FIG. 4, the roller assembly 50 is received within the mounting section 34 of the inner shaft 30 and the angled projection 44 of the outer shaft is received within the angled groove 32 of the inner shaft 30.

In an exemplary embodiment, the spring 52 includes a base section 60, a first biasing section 62 and a second biasing section 64. The base section 60 is seated in the mounting section 34 of the inner shaft 30. The first biasing section 62 and the second biasing section 64 are formed as a first leaf 62 and second leaf 64, respectively. The first leaf 62 and the second leaf 64 extend from the base section 60 and support the first plurality of rollers 54 and the second plurality of rollers 56, respectively. The first leaf 62 is supported at one end by the base section 60 and is free at another end. The first leaf 62 urges the first plurality of rollers 54 between the angled projection 44 and the mounting section 34. Similarly, the second leaf 64 is fixed at one end to the base section 60 and is free at another end. The second leaf 64 urges the second plurality of rollers 56 between the angled projection 44 and the mounting section 34.

In an exemplary embodiment, the respective free ends of the first leaf 62 and second leaf 64 are spaced from each other. The angled projection 44 extends between the first plurality of rollers 54 and the second plurality of rollers 56. Accordingly, the first plurality of rollers 54 is rollingly engaged with a first side 45 of the angled projection 44 and a first side 35 of the mounting section 34 and the second plurality of rollers 56 is rollingly engaged with a second side 46 of the angled projection 44 and a second side 36 of the mounting section 34.

The first side 35 of the mounting section 34 and the first side 45 of the angled projection 44 extend in a non-parallel relationship so that they converge in a direction extending away from a center of the outer shaft 40 and inner shaft 30. Similarly, the second side 36 of the mounting section 34 and the second side 46 of the angled projection 44 extend in a non-parallel relationship so that they converge in a direction extending away from a center of the outer shaft 40 and inner shaft 30. Accordingly, the first leaf 62 may urge the first plurality of rollers 54 between the angled projection 44 and mounting section 34 such that each roller of the first plurality of rollers 54 is wedged between the first side 35 of the mounting section 34 and the first side 45 of the angled projection 44. Similarly, the second leaf 64 may urge the second plurality of rollers 56 between the angled projection 44 and the mounting section 34 such that each roller of the second plurality of rollers 56 is wedged between the second side 36 of the mounting section 34 and the second side 46 of the angled projection 44.

In an exemplary embodiment, the inner shaft 30 includes two angled grooves 32, with each angled groove 32 having a mounting section 34 and a roller assembly 50 positioned therein. Additionally, the outer shaft 40 may include two angled projections 44 to extend into the respective angled grooves 32 and between the respective first plurality of rollers 54 and the second plurality of rollers 56 in the mounting sections 34. In an exemplary embodiment, the two angled grooves 32, two mounting sections 34 and the two roller assemblies 50 may be positioned diametrically opposite from one another on the inner shaft 30. Similarly, the angled projections 44 may be positioned diametrically opposite from one another on the outer shaft 40. It is understood that the present invention is not limited to this configuration, and a different number of roller assemblies 50, together with the angled grooves 32 and angled projections 44 may be used and positioned at different locations along the inner shaft 30 and outer shaft 40.

It is understood that the arrangement of the parts is not limited to the configuration described above, and that other suitable arrangements are also envisioned. For example, the parts may be reversed, such that the inner shaft 30 includes the at least one angled projection 42 while the outer shaft 40 includes the at least one angled groove 32 having the mounting section 34 formed therein. Accordingly, the roller assembly 50 may be received in the mounting section 34 of the outer shaft 40. In such a configuration orientation of the spring 52 would be inverted as well.

In the exemplary embodiments above, the at least one roller assembly 50 forms a roller bearing between the inner shaft 30 and outer shaft 40 to accommodate low friction movement of the inner shaft 30 within the outer shaft 40 in the longitudinal direction. Lash, i.e., gaps between parts formed as a result of part-to-part variation during manufacturing may be taken up by the spring 52 urging the first and second plurality of rollers 54, 56 between a portion of the mounting section 34 and the angled projection 44 of the outer shaft 44. The roller assembly 50 may be easily and quickly assembled with the inner shaft 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A telescoping shaft in a steering column, the telescoping shaft comprising:

an outer shaft having a bore extending in a longitudinal direction and at least one projection or at least one groove;

an inner shaft telescopically received in the bore, the inner shaft having the other of the at least one groove and the at least one projection, the at least one groove matingly engaging the at least one projection so that the inner shaft is rotationally fixed relative to the outer shaft and moveable relative to the outer shaft in the longitudinal direction, each of the at least one groove having a mounting section formed therein; and a roller assembly positioned in the mounting section of each of the at least one groove, the roller assembly comprising:
  a spring extending within the mounting section, the spring having a first biasing section and a second biasing section;
  a first plurality of rollers positioned on the first biasing section of the spring; and
  a second plurality of rollers positioned on the second biasing section of the spring, the at least one projection extending between the first plurality of rollers and the second plurality of rollers, the first biasing section biasing the first plurality of rollers between the at least one projection and the mounting section, the second biasing section biasing the second plurality of rollers between the at least one projection and the mounting section.

2. The telescoping shaft of claim 1, wherein the roller assembly further comprises a first retainer for retaining the first plurality of rollers and a second retainer for retaining the second plurality of rollers.

3. The telescoping shaft of claim 1, wherein the at least one projection is positioned in the bore of the outer shaft, projects radially into the bore and extends along a length direction of the outer shaft, and the at least one groove is positioned on the inner shaft and extends along a length of the inner shaft.

4. The telescoping shaft of claim 3, wherein the outer shaft includes two projections and the inner shaft includes two grooves.

5. The telescoping shaft of claim 4, wherein each roller assembly further comprises a first retainer for retaining the first plurality of rollers and a second retainer for retaining the second plurality of rollers.

6. The telescoping shaft of claim 4, wherein the spring comprises a base section, the first biasing section is a first leaf extending from the base section to support the first plurality of rollers and the second biasing section is a second leaf extending from the base section to support the second plurality of rollers.

7. The telescoping shaft of claim 6, wherein the first leaf is supported at one end by the base and is free at another end.

8. The telescoping shaft of claim 7, wherein the second leaf is supported at one end by the base and is free at another end.

9. The telescoping shaft of claim 8, wherein the free ends of first leaf and the second leaf extend toward one another.

10. The telescoping shaft of claim 1, wherein the inner shaft and outer shaft form an intermediate shaft of the steering column.

11. The telescoping shaft of claim 1, wherein the inner shaft and outer shaft form a steering shaft of the steering column.

12. The telescoping shaft of claim 1, wherein the first rollers and second rollers are roller balls.

13. The telescoping shaft of claim 1, further comprising:
  a first retainer having a plurality of openings configured to receive respective rollers of the first plurality of rollers; and
  a second retainer having a plurality of openings configured to receive respective rollers of the second plurality of rollers.

14. The telescoping shaft of claim 1, wherein each opening of the plurality of openings of the first and second retainers is substantially U-shaped.

15. A roller assembly for use in a telescoping shaft of a steering column comprising:
  a spring having a base section, a first leaf extending from the base section and a second leaf extending from the base section;
  a first plurality of rollers linearly positioned on the first leaf of the spring;
  a first retainer having a plurality of openings configured to receive respective rollers of the first plurality of rollers;
  a second plurality of rollers linearly positioned on the second leaf of the spring, the second plurality of rollers spaced from, and extending parallel to the first plurality of rollers; and
  a second retainer having a plurality of openings configured to receive respective rollers of the second plurality of rollers.

16. The roller assembly of claim 15, wherein the first plurality of rollers and the second plurality of rollers are roller balls.

* * * * *